UNITED STATES PATENT OFFICE.

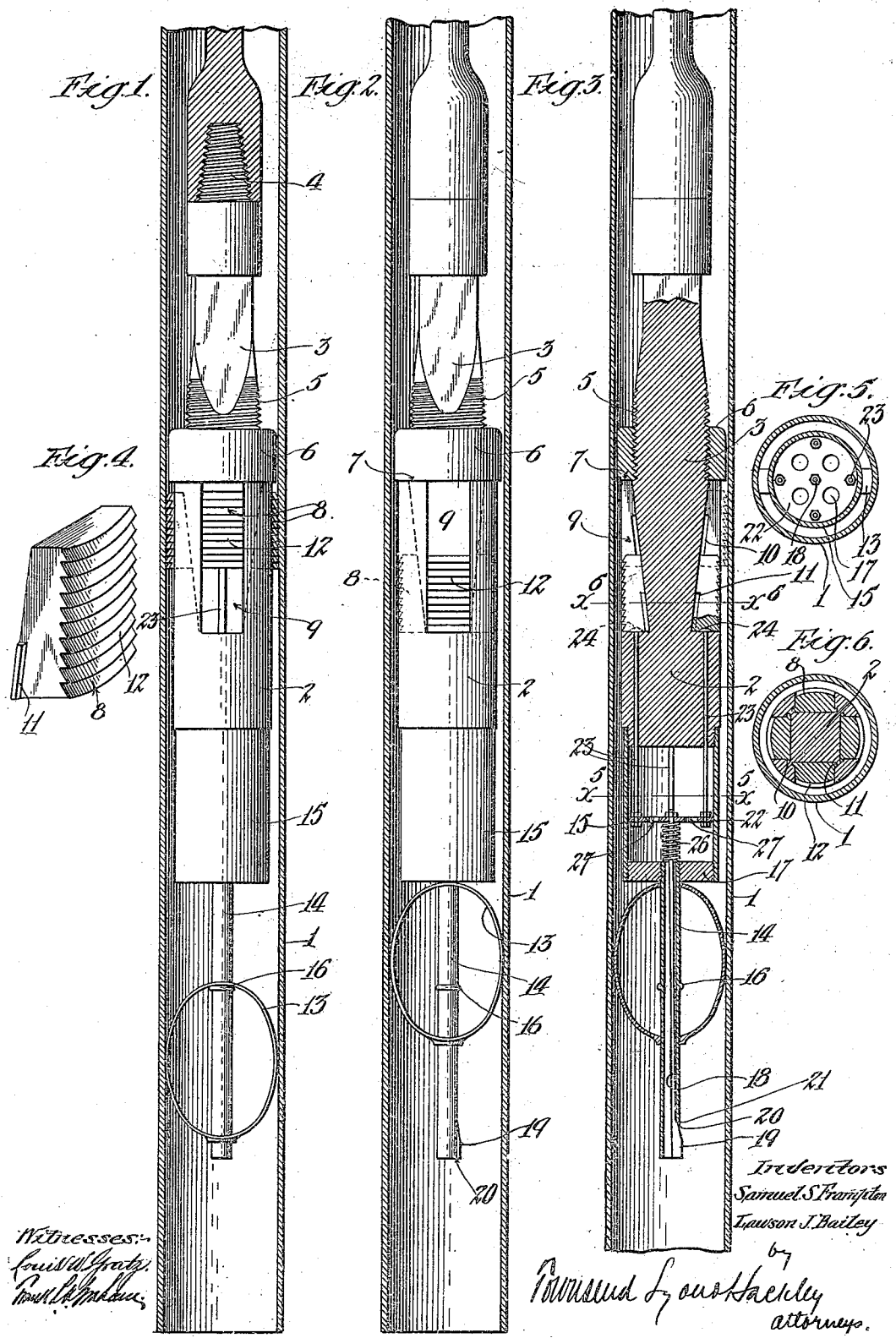

SAMUEL S. FRAMPTON AND LAWSON J. BAILEY, OF WHITTIER, CALIFORNIA.

DRIVE-SPEAR.

962,020.     Specification of Letters Patent.     Patented June 21, 1910.

Application filed March 8, 1909. Serial No. 482,192.

*To all whom it may concern:*

Be it known that we, SAMUEL S. FRAMPTON and LAWSON J. BAILEY, citizens of the United States, residing at Whittier, in the county of Los Angeles, State of California, have invented a new and useful Drive-Spear, of which the following is a specification.

This invention relates to a drive spear for driving casing, and the object of the invention is to provide a tool for driving the casing at or near the lower end thereof.

Heretofore in driving casing it has been driven from the top and when so driven the casing springs laterally, thus to a certain extent destroying the effect of the driving power and also having the tendency of deflecting the casing from a straight line. With the present invention, however, the tool is inserted and lowered in the casing and then operatively engaged with the casing at or near the lower end thereof, so that as the spear is then operated by the string the casing will be driven from its bottom end and by a pulling action rather than by a pushing action, and as the driving force is exerted on the casing at its lower end, the full power of the driving force is applied directly to the casing and without being lessened by the lateral springing action of its intermediate part, such as occurs when it is driven from the upper end. Moreover, as the power is applied to the casing at its lower or leading end it will be more apt to take a straight course than when it is driven from its following end or top.

Other objects of the invention are to so construct the drive spear that it may be readily inserted and lowered in the casing to the desired point and then automatically caused to be brought into operative relation with the casing, and to also provide for automatically removing the operative relation between the spear and casing to permit the spear to be readjusted in the casing or removed therefrom as desired.

The device is so constructed that the spear may be placed in operative relation with the casing at any point thereof, its application not necessarily being confined to the lower end of the casing or to any particular point of the casing, although the preferred point of its application is at or near the lower end of the casing.

Other objects and advantages of the device will be brought out in the following description.

The accompanying drawings illustrate the invention and referring thereto:—Figure 1 is a side elevation of the drive spear, showing it in position in a casing, the latter being shown in vertical section, the drive spear being in operative relation with the casing ready for driving the same. Fig. 2 is a view similar to Fig. 1, showing the drive spear with its parts in position for lowering into the casing. Fig. 3 is a view similar to Fig. 2, showing the spear in section. Fig. 4 is a perspective view, in detail, of one of the slips. Fig. 5 is a section on line $x^5$—$x^5$ Fig. 3. Fig. 6 is a section on line $x^6$—$x^6$ Fig. 3.

1 designates the casing. The drive spear comprises a cylindrical body portion 2 having a stem 3 threaded at 4 for attachment of the string and having threads 5 on which is screwed a collar 6, the latter bearing against the shoulder 7 on the body portion 2. The body portion is provided with slips 8 which are adapted to be brought into operative relation with the casing by controlling means preferably operating automatically, such controlling means consisting preferably of a device adapted to engage by friction or otherwise with the wall of the casing, the body portion of the spear being capable of movement relatively to the said means, which relative movement we utilize for operating or controlling the slips.

In the preferred form, the slips 8 are mounted to slide longitudinally of the body portion 2, the latter having a plurality of longitudinal recesses 9 with undercut grooves 10 which are engaged by lugs 11 formed on each slip, as clearly shown in Fig. 4. The outer face of each slip 8 is convex and provided with teeth 12 which are downwardly directed and adapted to grip the wall of the casing to drive the same downward. The back face of each slip 8 is beveled, as shown, to fit the correspondingly inclined bottom of the recess 9. The means for controlling the slips 8 preferably comprises a device adapted to frictionally grip the wall of the casing and consists of a friction bow 13 which is slidable on a tube 14, the latter being rigidly attached to a cylinder 15 which in turn is screwed to the lower end of the body portion 2. The tube 14 has a flange 16 which acts as a stop to limit the downward movement of the friction bow 13. The tube 14 is screwed into a head 17, the latter being screwed into the lower end of the cylinder 15, and extending through the tube 14 is a trip-rod 18 having at its lower end a beveled fin 19 which projects through a slot 20 in the lower end of the tube 14. A shoulder 21 is formed at the upper end of the fin 19 and is adapted to engage with the upper edge of the notch 20 to detachably lock the trip-rod 18 from upward movement, as will be described.

The upper end of the trip-rod is secured to a plate 22 and is given a permanent cant to one side, as shown in Fig. 3, so that when in register with the notch 20 the natural spring of the trip-rod will place the shoulder 21 in engagement with the notch. A series of bolts 23, preferably four in number, are secured to the lower end of the plate 22 and project up through the lower part of the body portion 2, so that their respective heads 24 lie within the respective recesses 9, each head 24 lying under the lower end of the associated slip 8, and the lower end of each slip having a concave recess adapted to seat on the convex bolt head 24. A coil spring 26 is arranged between the center head 17 and the plate 22. The plate 22 is provided with perforations 27 to act as air vents affording free action of the plate within the cylinder 15 and also permitting moisture or sediment which might accumulate within the cylinder to pass through the plate so that the free action of the plate in the cylinder will not be impeded.

To place the tool in condition for inserting and lowering it in the casing, the trip-rod 18, together with plate 22 and bolts 23, are placed in their lower positions, with the shoulder 21 of the trip-rod in engagement with the notch 20, thus holding the spring 26 under compression and preventing it from pushing up the plate 22 and bolts 23; and the slips 8 then lie by gravity in their lower positions at the small end of the wedge-shaped stem 3, and hence their teeth 12 do not then project beyond the smooth surface of the body portion 2, all parts of the device being then in the position shown in Figs. 2 and 3, and the spear then being in a condition such that it may be freely lowered in the casing to the lower end thereof or to any intermediate point.

When the spear has been lowered in the casing to the lower end thereof, or to the point at which it is desired to place the slips in operative engagement with the casing, the string is pulled up to lift the spear slightly, and as the friction bow 13 grips the wall of the casing the friction bow is held stationary, and as the spear is drawn up all parts of it ascend with the single exception of the friction bow 13 which remains in frictional engagement with the casing. As the beveled fin 19 rises and enters the lower end of the friction bow 13 the beveled edge of the fin causes the fin to be pressed inwardly, thereby releasing shoulder 21 from the upper edge of notch 20, and as soon as this release is accomplished the spring 26 expands and forces up the plate 22 and the bolts 23 ascend and push up the respective slips 8; and as the slips move up on their inclined ways they move outwardly and into contact with the wall of the casing.

When the slips have been moved into intimate contact with the casing the spear is driven down whereupon the lower wedge-shaped portion of the stem 3 forces out the slips 8 and causes the teeth 12 of all the slips to bite securely in the wall of the casing. The spear is then driven downward by the string and the casing is pulled down with it. To release the spear from the casing it is simply necessary to pull up the spear and as the slips still grip the casing the recesses 9 slide up on the slips as the spear is drawn up, and gradually withdraw the slips from their engagement with the casing. The only gripping action of the slips against the casing during this movement is that produced by the pressure of the spring 26, which is not sufficient to impede the withdrawal of the spear, particularly in view of the downward direction of the teeth 12, which during this movement ride backward freely over the casing.

What we claim is:

1. A drive spear comprising a body adapted to be inserted within the casing, slips slidable on said body, means for automatically sliding said slips upward into engagement with the casing, means for locking said means against movement, and friction means in operative relation thereto to release said locking means.

2. A drive spear comprising a body, slips thereon adapted to have operative relation with the casing, means engaging the casing and capable of relative movement with respect to said body, and means set in operation by the last means for actuating said slips.

3. A drive spear comprising a body, slips thereon adapted to operatively engage a casing, friction means below the body adapted to engage the casing, and means set in operation by said friction means for actuating said slips.

4. A drive spear comprising a body, slips thereon adapted to engage a casing, a friction bow adapted to grip the wall of the casing and slidable below said body, and means set in operation by the sliding of said friction bow for actuating said slips.

5. A drive spear comprising a body, slips having downwardly directed teeth adapted to grip the casing, means for frictionally engaging the casing, and means having an operative connection with said slips and said friction means for actuating the slips when the body is moved relatively to said friction means.

6. A drive spear comprising a body having inclined slip ways, slips mounted on said ways and adapted to be moved into or out of operative relation with the casing, a device for frictionally engaging the casing and slidable with relation to the body, and means set in operation by said friction device for operating said slips.

7. A drive spear comprising a body having inclined slip ways, slips mounted on said ways, said ways converging toward the bottom, a device adapted to frictionally engage the casing and slidable with relation to the body, and means in operative relation to said friction means for operating said slips.

8. A drive spear comprising a body, slips thereon adapted to be moved into operative relation with the casing, spring actuated means for moving said slips into operative relation with the casing, friction means for engaging the casing, and means for locking said spring actuated means, said locking means being released by said frictional engaging means upon the upward movement of the spear.

9. A drive spear comprising a body, slips on the body movable into or out of operative relation with the casing, a plate below the body, bolts extending from said plate through the body to operate said slips, a spring for actuating said plate, locking means for controlling said plate, and means adapted to frictionally engage the casing for releasing said locking means.

10. A drive spear comprising a body, slips thereon movable into or out of operative relation with the casing, a plate below the body, bolts extending from the plate through the body to operate the slips, a spring for actuating the plate, a tube connected with the body and below the plate and having a notch therein, a trip rod connected to the plate and lying in the tube said trip rod having a beveled fin with a shoulder adapted to detachably engage said notch, and a friction bow in which the tube is slidable for acting upon said fin to release the trip rod.

11. A drive spear comprising a body, slips thereon movable into or out of operative relation with the casing, a cylinder below said body, a plate slidable in said cylinder, bolts connected to said plate and extending through the lower part of said body to operate said slips, a spring between the lower head of said cylinder and said plate, a tube extending below said cylinder and having a notch, a trip rod connected to said plate and lying within said tube and having a shouldered fin adapted to detachably engage said notch, and a friction bow slidably mounted on said tube for engaging with the casing for disengaging said trip rod from said notch.

12. A drive spear comprising a body formed with recesses converging toward the bottom, slips in said recesses, friction means for engaging the casing, and means set in action by the friction means for lifting said slips thereby moving them outwardly as the body is lowered.

13. A drive spear comprising a body formed with recesses converging toward the bottom, slips in said recesses, friction means for engaging the casing, means for lifting said slips thereby moving them outwardly as the body is lowered, means for locking the last-named means in lowered position to prevent the slips from being moved outwardly as the drive spear is lowered into the casing, said friction means adapted upon the upward movement of the body to release said locking means.

14. A drive spear comprising a body, slips thereon, means normally operating upon a downward movement of the body for moving said slips outwardly into engagement with the casing, means for locking the last means against operation to permit the tool to be lowered in the casing, and means adapted to frictionally engage the casing for releasing said locking means upon an upward movement of the body and cause the slips to move into engagement with the casing and ready for their normal action upon the casing during the downward movement of the body.

15. A drive spear comprising a body having downwardly and inwardly inclined ways, slips mounted on said ways said ways lying closer to the axis of the body at the bottom than at the top, said slips when at the bottom of said ways being out of engagement with the casing and when at the top being in engagement with the casing, means capable of movement independent from the body, means adapted to grip the casing and permit the body to be moved independently of said means, and devices on said means for supporting said slips when the body is moved down to drive the casing.

16. A drive spear comprising a body having downwardly and inwardly inclined ways, slips mounted on said ways said ways lying closer to the axis of the body at the bottom than at the top, said slips when at the bottom of said ways being out of engagement with the casing and when at the top being in engagement with the casing, means capable of movement independent from the body, means adapted to grip the casing and permit the body to be moved independently of said means, devices on said means for supporting said slips when the body is moved down to drive the casing, and means for holding said supporting means retracted and permitting the slips to lie at the lower ends of the ways retracted from the casing to permit the tool being lowered in the casing.

17. A drive spear comprising a body having ways thereon which converge toward the bottom, slips slidable on said ways and having downwardly directed teeth adapted to grip the casing, a friction device below said body adapted to engage the casing, and spring means released by said friction device to move said slips upwardly on said ways.

18. A drive spear comprising a body having ways thereon which converge toward the bottom, slips slidable on said ways and having downwardly directed teeth adapted to grip the casing, a friction device below said body adapted to engage the casing, spring means released by said friction device for moving said slips upwardly on said ways, and means for locking said spring means, said locking means being adapted to be released by said friction device.

In testimony whereof, we have hereunto set our hands at Los Angeles California, this 2d day of March 1909.

SAMUEL S. FRAMPTON.
LAWSON J. BAILEY.

In presence of—
G. T. HACKLEY,
FRANK L. A. GRAHAM.